US007839032B2

(12) United States Patent
Nakamura

(10) Patent No.: US 7,839,032 B2
(45) Date of Patent: Nov. 23, 2010

(54) AUTOMOTIVE ALTERNATOR HAVING RECTIFIER DEVICE

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 368 days.

(21) Appl. No.: 12/007,674

(22) Filed: Jan. 14, 2008

(65) Prior Publication Data

US 2009/0001857 A1    Jan. 1, 2009

(30) Foreign Application Priority Data

Jun. 26, 2007  (JP) .............................. 2007-167956

(51) Int. Cl.
  *H02K 11/00*   (2006.01)
  *H02K 9/00*    (2006.01)
  *H02K 5/00*    (2006.01)

(52) U.S. Cl. .................. 310/68 D; 310/53; 310/58; 310/60 A; 310/89

(58) Field of Classification Search ............... 310/68 D, 310/53, 58, 6 A, 890
See application file for complete search history.

(56) References Cited

U.S. PATENT DOCUMENTS

| 6,074,963 | A  |  6/2000 | Okami et al. |
| 6,275,404 | B1 |  8/2001 | Shichijyo et al. |
| 6,307,289 | B1 | 10/2001 | Skala |
| 6,958,557 | B2 | 10/2005 | Shichijyo |
| 6,984,904 | B2 |  1/2006 | Kondo et al. |
| 7,116,022 | B2 * | 10/2006 | Koumura et al. .......... 310/68 D |

FOREIGN PATENT DOCUMENTS

| FR | 2685816 A1 * | 7/1993 |
| JP | A-04-244770 | 9/1992 |
| JP | 05299545 A * | 11/1993 |
| JP | A-5-299545 | 11/1993 |
| JP | A-5-316732 | 11/1993 |
| JP | A-06-098511 | 4/1994 |
| JP | A-6-510638 | 11/1994 |

(Continued)

OTHER PUBLICATIONS

Machine Translation JP2006149039 (2006);JP200287422 (2000); JP07266356 (1995); JP05299545 (1993); JP10308482 (1998);JP2002300756 (2002) and FR2685816 (1993).*

(Continued)

*Primary Examiner*—Quyen Leung
*Assistant Examiner*—Jose A Gonzalez Quinones
(74) *Attorney, Agent, or Firm*—Oliff & Berridge PLC

(57) ABSTRACT

An automotive alternator mounted on a vehicle for generating electric power includes front and rear frames, a cylindrical stator and a rotor. The cylindrical stator is contained in the frames, and the rotor is rotatably supported in the cylindrical stator. A rectifier device for rectifying alternating current generated in the stator into direct current is mounted on a rear surface of the rear frame and covered with a rear cover. To sufficiently cool minus rectifier elements positioned at a place not easily cooled only by the outside cooling air introduced into the alternator, a base portion of the minus rectifier element is contacted to the rear frame thereby to establish heat conduction therebetween. A resilient heat-conductive member is disposed between the base plate and the rear frame to absorb any dimensional discrepancies therebetween.

7 Claims, 5 Drawing Sheets

FOREIGN PATENT DOCUMENTS

| | | | |
|---|---|---|---|
| JP | 07266356 A * | 10/1995 | |
| JP | A-7-266356 | 10/1995 | |
| JP | 10308482 A * | 11/1998 | |
| JP | A-10-308482 | 11/1998 | |
| JP | 2000287422 A * | 10/2000 | |
| JP | A-2000-287422 | 10/2000 | |
| JP | A-2002-519987 | 7/2002 | |
| JP | 2002300756 A * | 10/2002 | |
| JP | A-2002-300756 | 10/2002 | |
| JP | A-2005-33985 | 2/2005 | |
| JP | 2006149039 A * | 6/2006 | |
| JP | A-2006-149039 | 6/2006 | |

OTHER PUBLICATIONS

Notification of Reason(s) for Refusal issued for Japanese Patent Application No. 2007-167956 filed on May 26, 2009.

English-language translation of Notice of Reasons for Rejection for Japanese Application No. 2007-167956, dated Feb. 5, 2009.

* cited by examiner

FRONT SIDE ← → REAR SIDE

AUTOMOTIVE ALTERNATOR HAVING RECTIFIER DEVICE

CROSS-REFERENCE TO RELATED APPLICATION

This application is based upon and claims benefit of priority of Japanese Patent Application No. 2007-167956 filed on Jun. 26, 2007, the content of which is incorporated herein by reference.

BACKGROUND OF THE INVENTION

1. Field of the Invention

The present invention relates to an alternator for use in an automotive vehicle.

2. Description of Related Art

An automotive alternator having a minus rectifier element, a base portion of which extends toward a rear frame and contacts the rear frame for better dissipating heat, has been known hitherto. An example of such an alternator is disclosed in JP-A-2002-519987. In this alternator, a plus cooling fin on which plus rectifier elements are mounted and a minus cooling fin on which minus rectifier elements are amounted are connected to a rear frame, forming a two-story structure. A base portion of each minus rectifier element extends from the minus cooling fin toward the rear frame and contacts the rear frame, thereby to better cool the minus rectifier element. Since the plus rectifier elements are positioned at a place better cooled by cooing air in this structure, it is not necessary for the plus rectifier elements to devise a structure for better cooling.

In the rectifier cooling structure mentioned above, the following problems are involved. (1) It is very difficult to establish a close contact between a base portion of the minus rectifier element and a seat portion of the rear frame for all of the minus rectifier elements. This is because a length of the base portion extending from the fin cannot be made uniform for all minus rectifier elements since the minus rectifier element is forcibly inserted into a hole of the minus cooling fin. If there is a minus rectifier element not contacting the rear frame, that element is not sufficiently cooled and may be damaged by heat. (2) If it is tried to establish the contact with the rear frame for all of the minus rectifier elements, some of the rectifier elements may be pushed against the rear frame with a force unbearable by the rectifier element. (3) In order to establish the close contact between the minus rectifier element and the rear frame for all of them, the length of the base portion extending from the minus cooling fin has to be very precisely controlled for all of the minus rectifier elements. This requires an impermissibly high manufacturing cost.

SUMMARY OF THE INVENTION

The present invention has been made in view of the above-mentioned problems, and an object of the present invention is to provide an improved automotive alternator, in which rectifier elements are well cooled by heat conduction to a frame.

The alternator is mounted on an automotive vehicle and driven by an engine thereby to generate electrical power. The alternator includes a front frame, a rear frame, a rotor and a cylindrical stator. The cylindrical stator is contained in the front and rear frames, and the rotor is rotatably supported in the cylindrical stator. A rectifier device for rectifying alternating current generated in the stator into direct current is mounted on an outside surface of the rear frame and covered by a rear cover. The rectifier device includes a plus cooling fin on which plus rectifier elements are mounted and a minus cooling fin on which minus rectifier elements are mounted.

The minus cooling fin is connected to the rear surface of the rear frame, and the plus cooling fin is overlapped on the minus cooling fin with a certain space therebetween. Both cooling fins are cooled down by outside air introduced into the alternator in both the radial and axial directions. To sufficiently cool the minus rectifier elements disposed inside of the plus rectifier elements, a base portion of the minus rectifier element is contacted to the rear frame in the following manner.

The base portion of the minus rectifier element is extended through the minus cooling fin toward the rear frame. A seat portion is formed on the rear frame by depressing part of the rear frame, so that the base portion contacts the seat portion. To establish a close contact between the seat portion and the base portion, a resilient heat-conductive member is disposed between the base portion and the seat portion. In this manner, good heat conduction is realized between each of the minus rectifier elements and the rear frame even if there is a deviation among lengths of the base portions of the minus rectifier elements extending from the minus cooling fin, because such deviation is absorbed by the resiliency of the resilient heat-conductive member. The resilient heat conductive-member may be made in various ways. For example, it may be made of a porous resin into which conductive grease is impregnated or may be made of a resilient metallic plate.

According to the present invention, the minus rectifier elements positioned at a place not easily cooled are effectively cooled by both the outside cooling air introduced into the alternator and heat conduction to the rear frame. Other objects and features of the present invention will become more readily apparent from a better understanding of the preferred embodiments described below with reference to the following drawings.

DETAILED DESCRIPTION OF THE PREFERRED EMBODIMENTS

Figure 1:
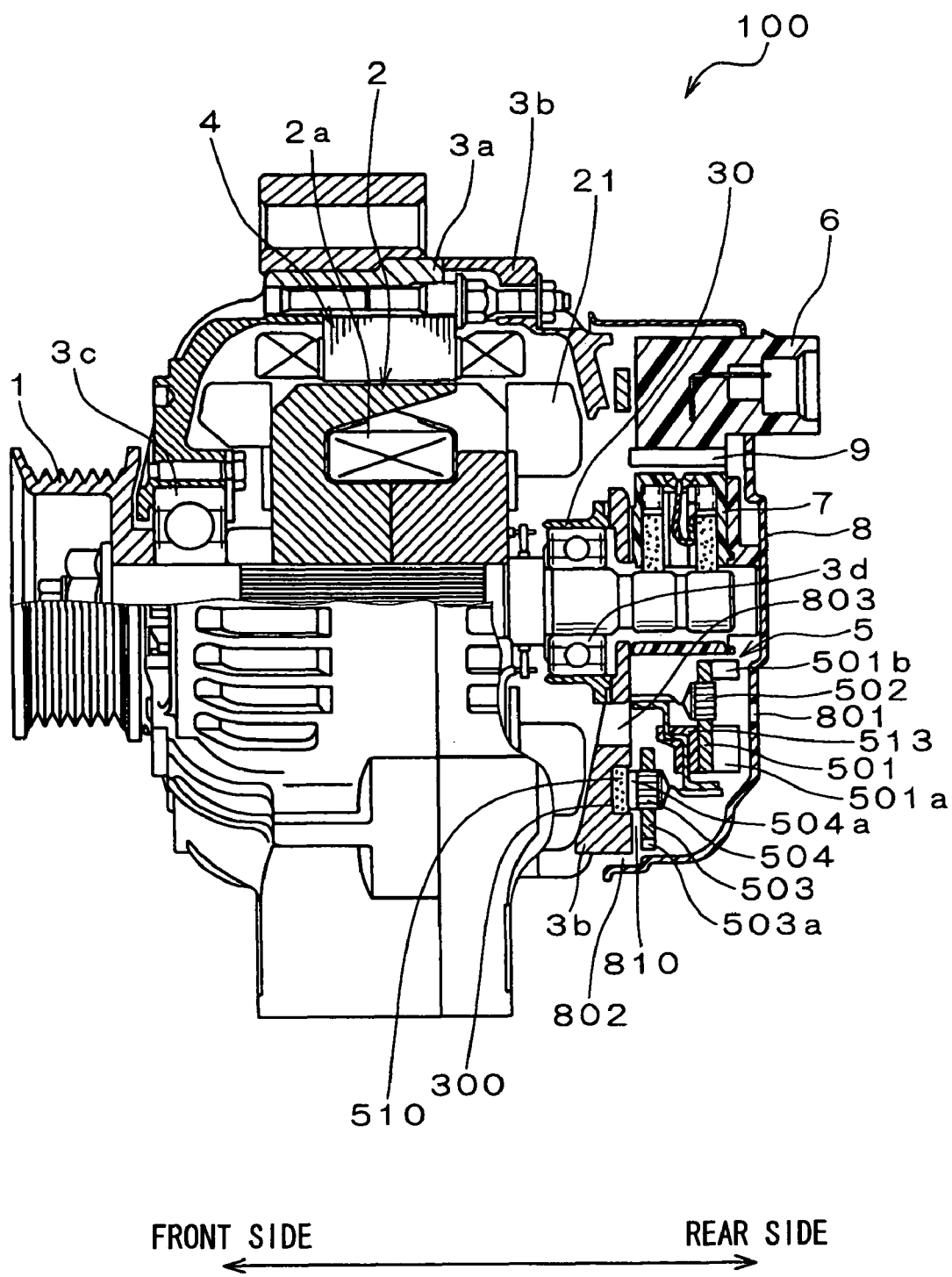
FIG. 1 is a cross-sectional view showing an automotive alternator as a first embodiment of the present invention.

A first embodiment of the present invention will be described with reference to FIGS. 1-7. An alternator 100 shown in FIG. 1 is mounted on an automobile vehicle and driven by an engine of the vehicle through a driving belt. The alternator 100 includes: a rotor 2 having a pulley 1 that is driven by the engine through a driving belt; a stator 4 in a cylindrical shape functioning as an armature; a front frame 3a having a bearing 3c and a rear frame 3b having a bearing 3d; the rotor 4 being rotatably supported by the bearings 3c, 3d in an inner bore of the stator 4; a rectifier device 5 for converting alternating current generated in the stator 4 to direct current; a brush holder 7 holding brushes for supplying field current to a field coil 2a of the rotor 2; a regulator 9 for controlling output voltage; a connector case 6 having a terminal for electrically communicating with devices mounted on the vehicle; and a rear cover 8 made of resin covering the rectifier device 5, the regulator 9 and the brush holder 7 disposed on a rear surface of the rear frame 3b. A front side and a rear side of the alternator 100 are indicated with an arrow in FIG. 1.

Figure 2:
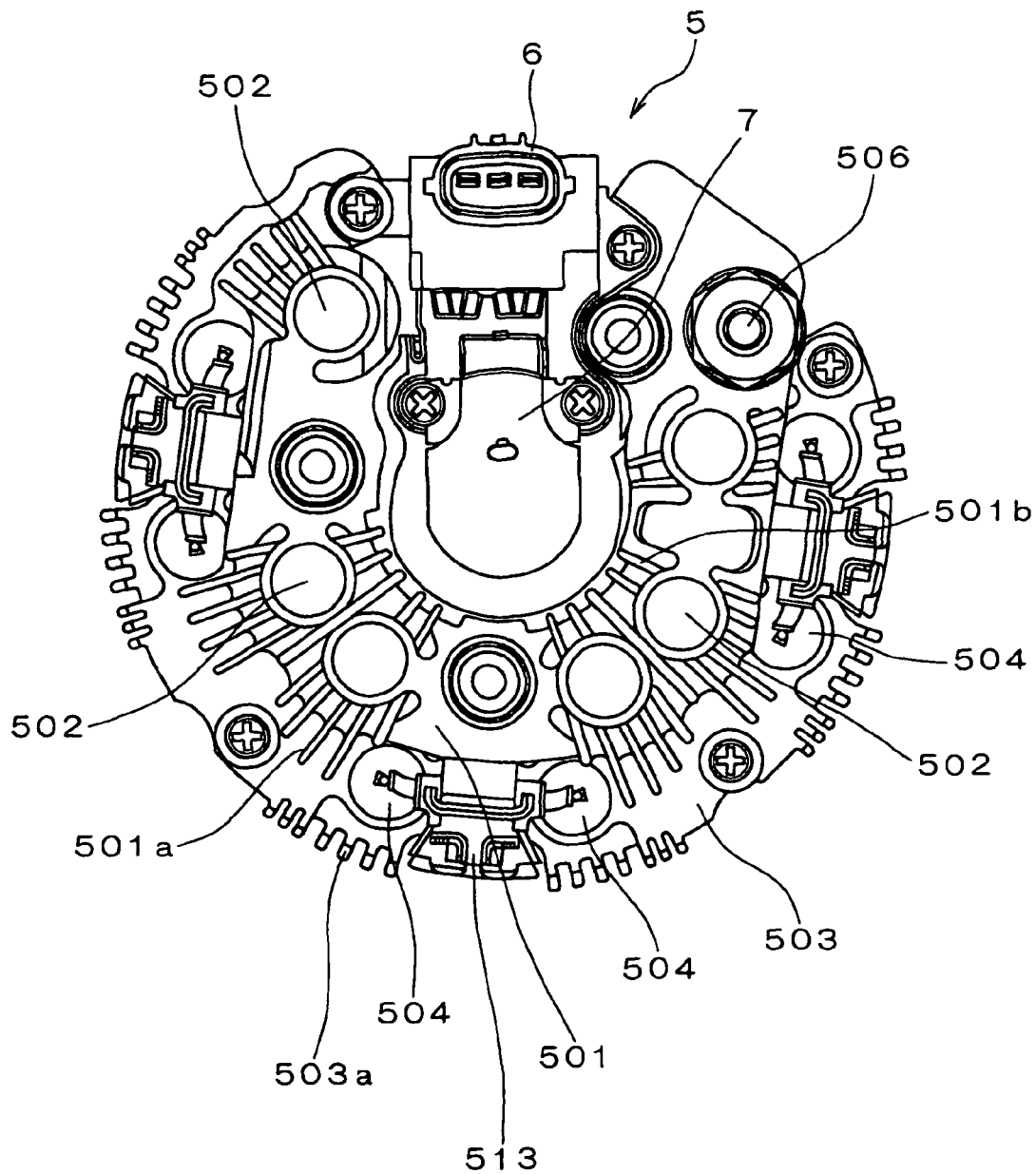
FIG. 2 is a plan view showing a rectifier device used in the alternator shown in FIG. 1.

FIG. 2 is a plan view showing the rectifier device 5, on which the brush holder 7 and the connector case 6 are mounted. The rectifier device 5 includes a minus cooling fin 503, on which minus rectifier elements are mounted, a plus cooling fin 501, on which plus rectifier elements 502 are mounted, and a terminal plate 513. The rectifier device 5 constitutes two pairs of three-phase full-wave rectifiers with six plus side rectifier elements (which are referred to as the plus rectifier elements 502) and six minus side rectifier elements (which are referred to as the minus rectifier elements 504).

The terminal plate 513 is made of resin for insulating the plus cooling fin 501 from the minus cooling fin 503, and includes conductive members for leading alternating current generated in the stator 4 to the plus rectifier elements 502 and the minus rectifier elements 504. The minus cooling fin 503 is disposed to face the rear surface of the rear frame 3b, and the plus cooing fin 501, which has a smaller outer peripheral size than the minus cooling fin 503, is disposed on the minus cooling fin 503 with a certain space formed therebetween, thereby forming a two-story structure. The plus rectifier elements 502 are press-fitted into respective holes formed in the plus cooling fin 501, and its lead terminals are extended toward the minus cooling fin 503. The minus rectifier elements 504 are press-fitted into respective holes formed in the minus cooling fin 503, and its lead terminals are extended toward the plus cooling fin 501. The lead terminals of all the rectifier elements 502, 504 are electrically connected to the conductive members of the terminal plate 513.

The direct current output is taken out from a bolt 506 connected to the plus cooling fin 501 after the alternating current generated in the stator 4 is rectified by the rectifier device 5. The rectifier device 5 is connected to a bearing box 30 of the rear frame 3b with bolts, for example, together with the rear cover 8. Both of the cooling fins 501, 503 are made of aluminum or copper.

Openings 801 for introducing cooling air in the axial direction around the plus rectifier elements 502 are formed in the rear cover 8. Ribs 501a, 501b standing in the axial direction from the plus cooling fin 501 are formed on outer and inner peripheral portions of the plus cooling fin 501 thereby to increase an cooling area of the plus cooling fin 501. The plus rectifier elements 502 are cooled down by the cooling air introduced from the openings 801, and heat generated therein is dissipated through the plus cooling fin 501.

Sub fins 503a extending in the radial direction from an outer peripheral portion of the minus cooling fin 503 are formed thereby to increase an cooling area of the minus cooling fin 503. As shown in FIG. 1, an axial opening 802 is formed between an outer periphery of the rear frame 3b and the rear cover 8. A radial passage 810 is formed between the rear surface of the rear frame 3b and the minus cooling fin 503. The axial opening 802 and the radial passage 810 are connected to each other. When a fan 21 rotates together with the rotor 2, cooling air is introduced into the alternator from the openings 801 formed in the rear cover 8 and from the axial opening 802. The cooling air is further introduced into the alternator through openings 803 formed in the rear frame 3b to cool the rotor 2 and the stator 4. The minus cooling fin 503 is cooled by the cooling air thus introduced, and particularly by the cooling air passing through the axial opening 802 and the radial passage 810.

Now, a resilient heat conductive member 510 disposed between a base portion 504a of the minus rectifier element 504 and the rear frame 3b will be described. As shown in FIG. 1, a seat portion 300 is formed on the rear frame 3b by depressing the rear frame 3b. The base portion 504a of the minus rectifier element 504 extends through the minus cooling fin 503 toward the rear frame 3b and contacts the seat portion 300 via the resilient heat conductive member 510. The resilient heat conductive member 510 is held in the depression forming the seat portion 300. Heat generated in the minus rectifier element 504 is effectively conducted to the rear frame 3b via the resilient heat-conductive member 510.

Each of the minus rectifier elements 504 has the same structure as described above. The minus rectifier elements 504 are sufficiently cooled by the cooling air introduced into the alternator and by the heat conduction to the rear frame 3b. Since the minus rectifier elements 504 resiliently contact the rear frame 3b, good contact is secured for all the minus rectifier elements 504 even if there is a certain deviation among the lengths of the respective base portions 504a extending through the minus cooling fin 503. Thus, all the minus rectifier elements 504 are well cooled without fail.

Some more details of the resilient heat-conductive member 510 will be described with reference to FIG. 3. In the example shown in FIG. 3, the resilient heat-conductive member 510 is made of porous resin into which heat-conductive grease is impregnated. The base portion 504a of the minus rectifier element 504 that is press-fitted into a hole of the minus cooling fin 503 extends from the minus cooling fin 503. The bottom surface of the depression formed in the rear frame 3b serves as the seat portion 300 that contacts the base portion 504a via the resilient heat-conductive member 510. The base portion 504a of the minus rectifier element 504 surely contacts the seat portion 300 by the resiliency of the resilient heat-conductive member 510.

Figure 3:
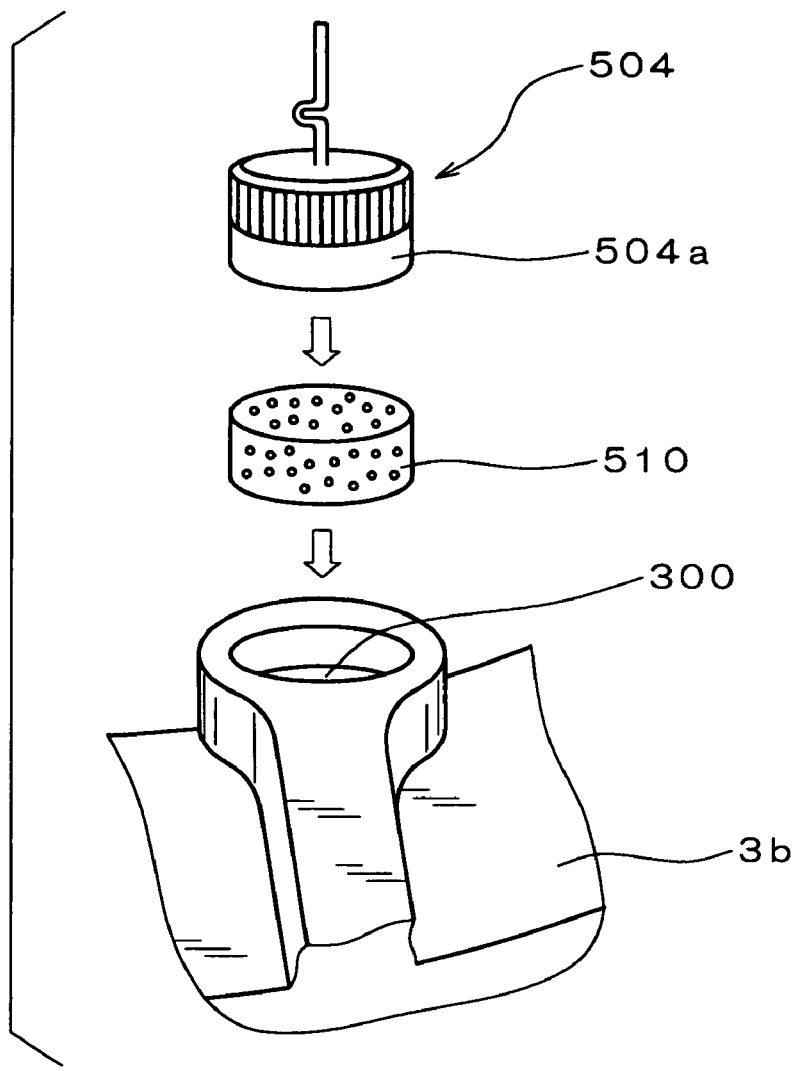
FIG. 3 is a perspective view showing a way of mounting a resilient heat-conductive member between a rectifier element and a frame.
Figure 4:
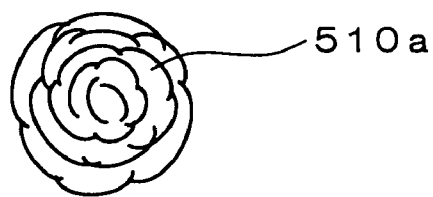
FIG. 4 is a perspective view showing another example of the resilient heat-conductive member made of metallic fibers.
Figure 5:
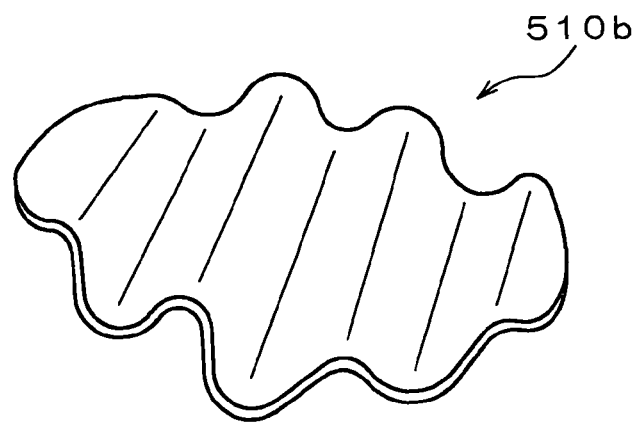
FIG. 5 is a perspective view showing yet another example of the resilient heat-conductive member made of a metallic plate.

The resilient heat-conductive member 510 shown in FIG. 3 may be variously modified. Some modified forms are shown in FIGS. 4-7. A resilient heat-conductive member 510a shown in FIG. 4 is made by rounding and tangling metallic fibers in a ball-shape. By pushing the resilient heat-conductive member 510a between the base portion 504a and the seat portion 300, a good heat contact is established. A resilient heat-conductive member 510b shown in FIG. 5 is made of a metallic plate having waves depressed and projected in the axial direction of the rotor 2. By pushing the resilient heat-conductive member 510b in the axial direction, a good heat contact is established between the base portion 504a and the seat portion 300.

Figure 6:
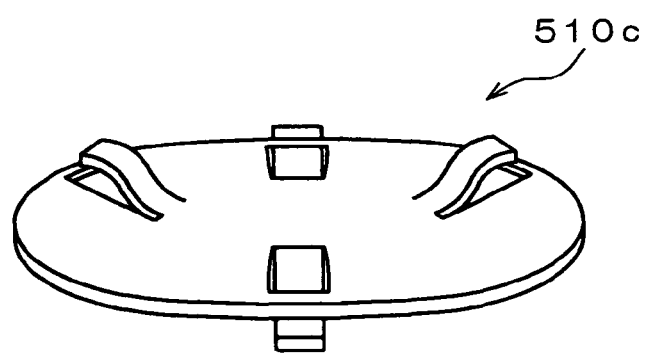
FIG. 6 is a perspective view showing yet another example of the resilient heat-conductive member made of a metallic plate having cutouts.
Figure 7:
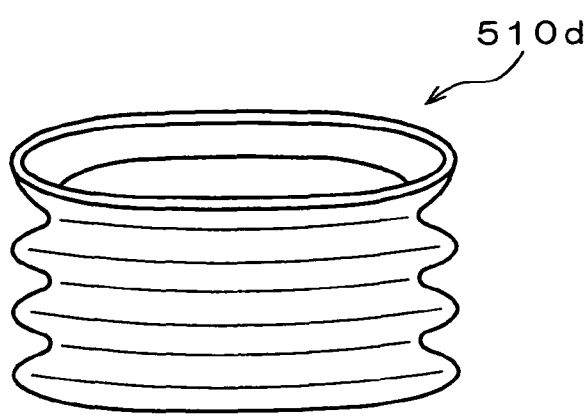
FIG. 7 is a perspective view showing yet another example of the resilient heat-conductive member made of a metallic cylinder having bellows.

A resilient heat-conductive member 510c shown in FIG. 6 is made by forming cutouts raised in the axial direction on a metallic plate. In this particular example, four cutouts are formed. By pushing the cutouts in the axial direction, a good heat contact is similarly established. A resilient heat-conductive member 510d shown in FIG. 7 is made of a metallic cylinder having bellows deformable in the axial direction. By pushing the resilient heat-conductive member 510d in the axial direction, a good heat contact is similarly established.

Figure 8:
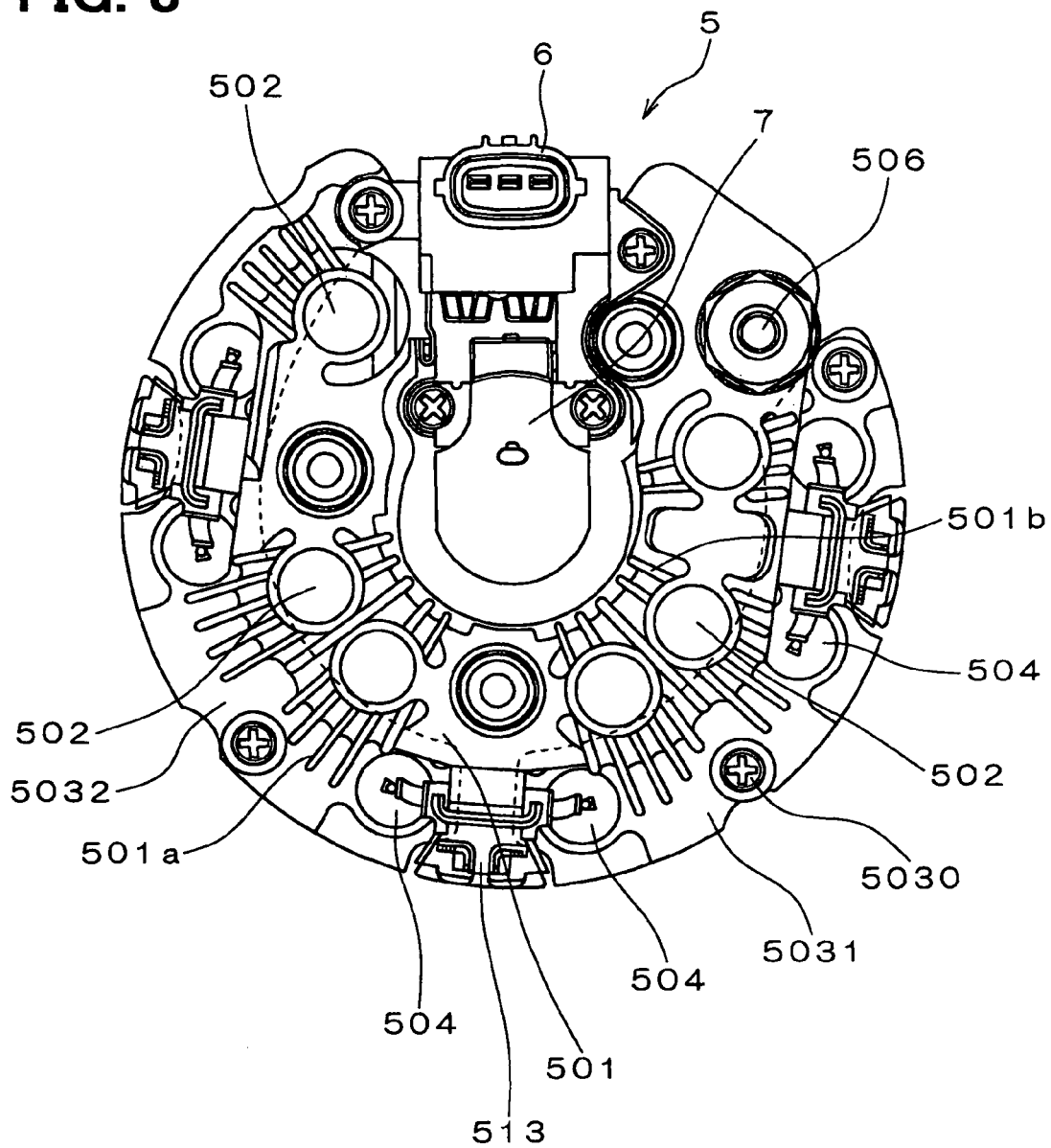
FIG. 8 is a plan view showing a rectifier device as a second embodiment of the present invention.
Figure 9:
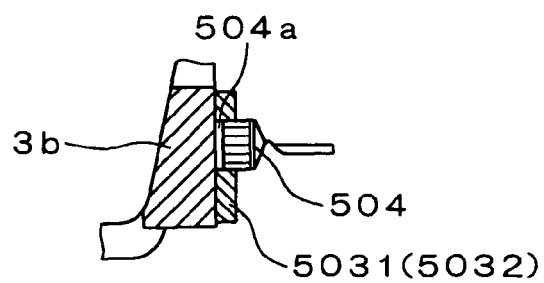
FIG. 9 is a partial cross-sectional view showing a rectifier element used in the rectifier device shown in FIG. 8.

A second embodiment of the present invention will be described with reference to FIGS. 8 and 9. In this embodiment, the minus cooling fin is divided into two portions 5031 and 5032, as shown in FIG. 8. A base surface of the base portion 504a of the minus rectifier element 504 is made flush with a surface of the minus cooling fin 5031 (5032), which in turn closely contacts the rear frame 3b, as shown in FIG. 9. Accordingly, the base portion 504a directly contacts the rear frame 3b, establishing a good heat conduction from the minus rectifier element 504 to the rear frame 3b. Other structures and functions of the rectifier device 5 are the same as those of the first embodiment. In the second embodiment, the base surface of the base portion 504a is made flush with the surface of the minus cooling fin 503, and the minus cooling fin 503 is divided into two portions and connected to the rear frame 3d with respective bolts. Therefore, the influence of the deviation in the axial dimensions between the base portion 504a and the minus cooling fin on the heat conductivity is alleviated in the second embodiment.

The present invention is not limited to the embodiments described above, but it may be variously modified. For example, though the base portion 504a is part of the minus rectifier element 504 in the foregoing embodiments, the base portion 504a may be made as a part separate from the minus rectifier element 504 and attached to the minus rectifier element 504. The ribs 501a, 501b formed on the plus cooling fin 501 and the sub fins 503a of the minus cooling fin 503 may be eliminated in certain applications.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An automotive alternator comprising:
   a cylindrical stator;
   a rotor rotatably disposed in the stator;
   front and rear frames for accommodating the stator and the rotor therein;
   a rectifier device connected to an outside of the rear frame, the rectifier device including minus rectifier elements mounted on a minus cooling fin and plus rectifier elements mounted on a plus cooling fin; and
   a rear cover covering the rectifier device, wherein:
   each of the minus rectifier elements includes a base portion extending from the minus cooling fin toward the rear frame;
   the rear frame includes seat portions, each corresponding to the base portion of each minus rectifier element;
   a resilient heat-conductive member is disposed between each seat portion and each base portion of the minus rectifier element, thereby establishing good heat conduction between the minus rectifier element and the rear frame; and
   each seat portion is formed by depressing a portion of the rear frame in an axial direction of the rotor so as to position the heat-conductive member in each seat portion and to prevent the heat-conductive member from falling out of each seat portion.

2. The automotive alternator as in claim 1, wherein a radial passage is formed between the minus cooling fin and the rear frame thereby to introduce outside air into the alternator and to cool the minus cooling fin.

3. The automotive alternator as in claim 1, wherein the resilient heat-conductive member is a porous resin member into which heat-conductive grease is impregnated.

4. The automotive alternator as in claim 1, wherein the resilient heat-conductive member is a member formed by rounding and tangling metallic fibers.

5. The automotive alternator as in claim 1, wherein the resilient heat-conductive member is a metallic plate having waves depressed and projected in the axial direction.

6. The automotive alternator as in claim 1, wherein the resilient heat-conductive member is a metallic plate having cutouts raised in the axial direction.

7. The automotive alternator as in claim 1, wherein the resilient heat-conductive member is a metallic cylinder having bellows deformable in the axial direction.

* * * * *